(12) United States Patent
Hofer et al.

(10) Patent No.: US 9,714,884 B2
(45) Date of Patent: Jul. 25, 2017

(54) METHOD AND DEVICE FOR RECOGNIZING STATE OF NOISE-GENERATING MACHINE TO BE INVESTIGATED

(75) Inventors: Joachim Hofer, München (DE); Lutz Leutelt, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1253 days.

(21) Appl. No.: 12/736,675

(22) PCT Filed: Apr. 29, 2009

(86) PCT No.: PCT/EP2009/055165
§ 371 (c)(1),
(2), (4) Date: Oct. 29, 2010

(87) PCT Pub. No.: WO2009/133123
PCT Pub. Date: Nov. 5, 2009

(65) Prior Publication Data
US 2011/0047107 A1    Feb. 24, 2011

(30) Foreign Application Priority Data

Apr. 29, 2008  (DE) .......................... 10 2008 021 362

(51) Int. Cl.
*G06N 99/00*   (2010.01)
*G01M 15/12*   (2006.01)
(52) U.S. Cl.
CPC ............ *G01M 15/12* (2013.01); *G06N 99/00* (2013.01)

(58) Field of Classification Search
CPC ............................. G06N 99/00; G01M 99/005
See application file for complete search history.

(56) References Cited

U.S. PATENT DOCUMENTS

| | | | |
|---|---|---|---|
| 6,347,285 B1 | 2/2002 | Hamadou et al. | |
| 6,591,226 B1 | 7/2003 | Hartmann et al. | |
| 2001/0044719 A1* | 11/2001 | Casey | 704/245 |
| 2002/0107625 A1 | 8/2002 | Beck et al. | |

(Continued)

FOREIGN PATENT DOCUMENTS

| | | |
|---|---|---|
| DE | 199 14 533 A1 | 11/2000 |
| DE | 101 00 522 A1 | 7/2002 |

(Continued)

OTHER PUBLICATIONS

Benko et al., "Fault diagnosis of a vacuum cleaner motor by means of sound analysis", in J. Sound and Vibration vol. 276 (2004), pp. 781-806.*

(Continued)

*Primary Examiner* — Vincent Gonzales
(74) *Attorney, Agent, or Firm* — Slayden Grubert Beard PLLC (57) ABSTRACT

A statistical basic classification model of acoustic features generated for at least one reference object is automatically adapted by a data processing unit based on acoustic features of a noise generated by an object to be investigated to obtain an individually adapted statistical classification model. The data processing unit then classifies the state of the noise-generating object based on the individually adapted statistical classification model.

22 Claims, 4 Drawing Sheets

(56) References Cited

U.S. PATENT DOCUMENTS

| | | |
|---|---|---|
| 2006/0020402 A1 | 1/2006 | Bischoff et al. |
| 2009/0012783 A1* | 1/2009 | Klein .......................... 704/226 |
| 2010/0014685 A1* | 1/2010 | Wurm ................. G10K 11/178 |
| | | 381/71.11 |

FOREIGN PATENT DOCUMENTS

| | | |
|---|---|---|
| DE | 10 2004 006 848 A1 | 9/2005 |
| DE | 10 2004 012 911 A1 | 10/2005 |
| DE | 102008021362.4 | 4/2008 |
| EP | 1 564 688 A1 | 8/2005 |

OTHER PUBLICATIONS

International Search Report for PCT/EP2009/055165; mailed Sep. 29, 2009.
German Office Action for Application No. 10 2008 021 362.4-52; mailed Oct. 22, 2008.
Russian Office Action mailed Apr. 10, 2013 for corresponding Russian Application No. 2010148369/28.
I.A. Birger, "Technical Diagnostics", Publishing House "Mashinostroenie", Moscow, 1978, pp. 161-168, 185-193.
B.V. Pavlov, "Acoustical diagnostics of mechanisms", Publishing House "Mashinostroenie", 1971, Moscow, pp. 22, 24-40, 169-179.
Russian Office Action mailed Jan. 29, 2012 in corresponding Russian Application No. 2010148369/28.

* cited by examiner

METHOD AND DEVICE FOR RECOGNIZING STATE OF NOISE-GENERATING MACHINE TO BE INVESTIGATED

CROSS REFERENCE TO RELATED APPLICATIONS

This application is the U.S. national stage of International Application No. PCT/EP2009/055165, filed Apr. 29, 2009 and claims the benefit thereof. The International Application claims the benefits of German Application No. 10 2008 021 362.4 filed on Apr. 29, 2008, both applications are incorporated by reference herein in their entirety.

BACKGROUND

Described below are a method and device for recognizing a state of a noise-generating machine to be investigated, which emits structure-borne or air-borne sound.

Machines execute movements, during the course of which oscillation signals, in particular acoustic oscillation signals, are generated. The oscillation signals generated by a machine, a system or an electromechanical device allow conclusions to be drawn about its respective current state, which can change for example due to wear phenomena. For example a machine or device generates different oscillation signals after several years of use due to wear phenomena from those it generates immediately after production. As well as machines chemical systems can also produce noise signals, for example due to gas bubbles in containers or pipes. The ageing or wear of systems, machines and devices causes changes to the oscillation signals generated, in particular the acoustic emissions. The oscillation signals generated by a machine, system or device, in particular the acoustic noise signals, are not only a function of wear but also of the type of structure. Machines, systems and devices frequently feature different product types or models within a product group. For example a company can manufacture different variants of water or heating pumps, the generated noise signals of which differ. Also the objects manufactured within the product groups or product variants also have manufacturing tolerances, so that different products or objects can emit different noise signals due to manufacturing tolerances. In addition to ageing and loading influences as well as manufacturing tolerances the spatial properties of the environment in which the device or system is located also influence the noise signals or acoustic emissions emitted by the device or system.

With known methods for recognizing a state of a noise-generating machine to be investigated a plurality of recordings are made at a manufactured prototype, in order to generate a model of the respective noise-generating machine or system. A plurality of recordings, in particular sound recordings, which take into account different influencing variables, are made in a training process. For example acoustic noise signals emitted by a prototype are recorded in different weather conditions and with different loadings at different times. To take different influencing variables into account, a plurality of recordings must be made. Model generation based on the prototype becomes more complex, the more different variants of the product there are. The training data is used to generate a statistical model or a physical model of the object or product, which can then be used to classify a noise signal, which is emitted by a manufactured product during ongoing operation after commissioning. An operating state of a product can be monitored based on the classification of the noise signal, so that any error states occurring and thus the need for maintenance work can be recognized.

One disadvantage of a known procedure is that the noise signals or acoustic emissions emitted by a manufactured product can differ or deviate from the noise signals of the prototype even in a normal or error-free state. One reason for this may be that the manufactured product, which can be a machine, device or system for example, is in a different environment from that of the prototype when the training data was recorded. The useful signal, in other words the acoustic emissions of the object to be investigated, is therefore overlaid with ambient noise in the manner of an interference signal. For example the training data can be recorded at a prototype in a space with little reverberation, while the object to be investigated, perhaps a manufacturing machine, is located in a factory, where acoustic signals are reflected to a significant degree. The product or system to be investigated can also have a different acoustic emission spectrum from the prototype due to manufacturing tolerances or a different configuration.

SUMMARY

An aspect is therefore to create a method and device, with which a state of a noise-generating object to be investigated can be recognized reliably with little outlay.

The method for recognizing a state of a noise-generating object to be investigated, uses a statistical basic classification model of acoustic features generated for at least one reference object which is automatically adapted based on acoustic features of a noise generated by the object to be investigated and the state of the noise-generating object to be investigated is classified based on the adapted statistical classification model.

The noise-generating object can be any machine or device or a system, for example a chemical system.

In one embodiment of the method the reference object is formed by a prototype of the object to be investigated.

In one embodiment of the method the noise-generating object to be investigated features at least one motor-driven noise-generating module.

In one embodiment of the method the statistical classification model is adapted during commissioning of the object to be investigated, at regular maintenance intervals or when there is a change in the acoustic environment of the object to be investigated.

In one embodiment of the method the statistical basic classification model of acoustic features is generated on the basis of a plurality of acoustic sound recordings, which are made at the reference object in different conditions or at different times.

In one embodiment of the method the generated statistical basic classification model is stored in a memory.

In one embodiment of the method the stored basic classification model is automatically adapted based on a plurality of acoustic sound recordings, which are made at the noise-generating object to be investigated, and are buffered as an adapted statistical classification model.

In one embodiment of the method the acoustic sound recordings are made by acoustic sound pickups, which capture air-borne or structure-borne sound.

In one embodiment of the method the statistical classification model is adapted for the entire noise-generating object or for modules of the noise-generating object.

In one embodiment of the method the acoustic sound pickups are attached to the noise-generating object to be investigated or are passed by the noise-generating object to be investigated.

In one embodiment of the method an adapted statistical classification model is calculated for different possible positions of the acoustic sound pickup passing the object to be investigated.

In one embodiment of the method an adapted statistical classification model is calculated respectively for the possible positions of the passing acoustic sound pickup.

In one embodiment of the method the possible positions of the passing acoustic sound pickup correspond to the spatial arrangement of different modules of the noise-generating object to be investigated.

The device for recognizing a state of a noise-generating object to be investigated, uses a statistical basic classification model of acoustic features generated for at least one reference object which is automatically adapted by a data processing unit based on acoustic features of a noise generated by the object to be investigated, the data processing unit classifying the state of the noise-generating object to be investigated based on the adapted statistical classification model.

In one embodiment of the device it features at least one acoustic sound pickup for capturing a structure-borne or air-borne sound generated by the noise-generating object to be investigated.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Figure 1:
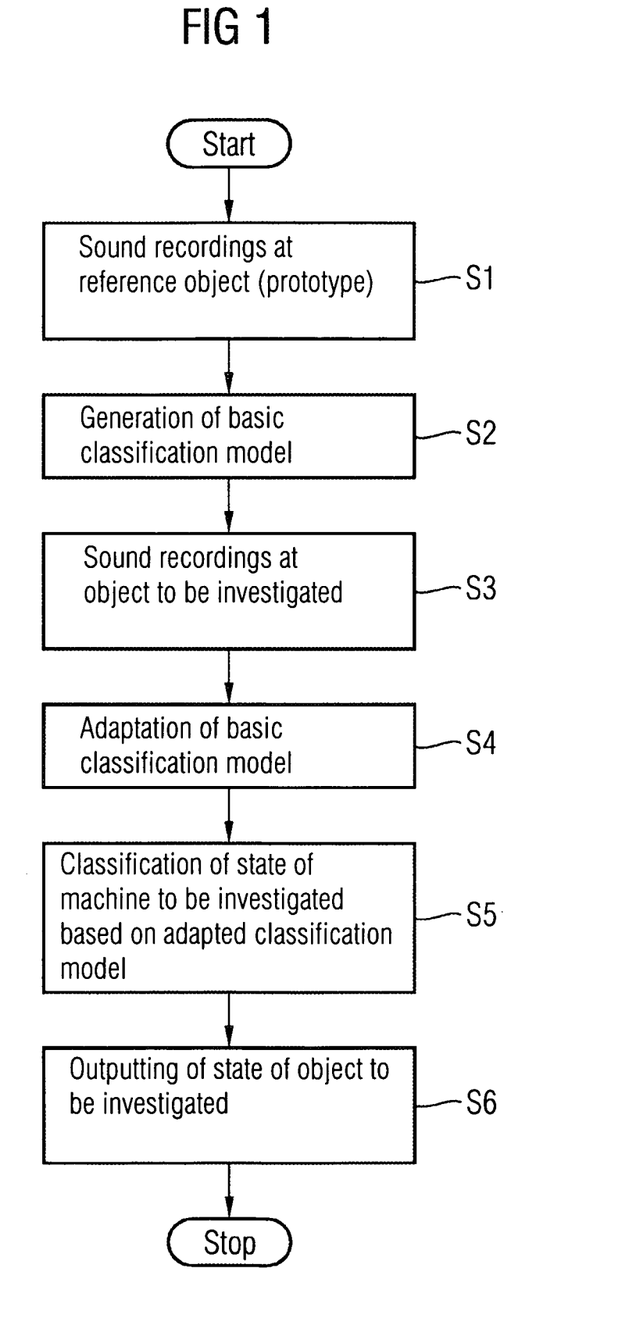
FIG. 1 is a flow diagram illustrating one possible embodiment of the method.

As shown in FIG. 1, the method at S1 uses sound pickups or sensors to make sound recordings at a reference object of the noise-generating object to be investigated. The reference object can be a prototype of the object. The object is for example a machine or a device, which generates noise during ongoing operation. The noise signal can be an air-borne sound signal or a structure-borne sound signal. The object to be investigated can also be a system, for example a chemical system, which produces noise, for example within tank facilities or pipes, during a chemical manufacturing process. The noise or oscillation signal is picked up or recorded using sound pickups. These sound pickups feature microphones or other oscillation sensors, in particular acceleration sensors. The sound pickups or oscillation sensors convert the noise or oscillation signal to an electrical signal. The sound recordings at the reference object or at the prototype may be made at different times in different ambient conditions.

Then at S2, features m of the sound signal or oscillation signal are extracted based on the sound recordings. Possible features are for example the amplitude or volume of the sound or noise signal. Further possible features are spectral features of the noise signal and their temporal modulations. Features of the modulation spectrum can also be used for example. A feature vector M can be determined in each instance for the different recordings made at the reference object. 10-500 features m of the noise signal are typically considered. The number N of recordings at the reference object is set as a function of the object under consideration. Generally N>100 sound recordings of the reference object are evaluated. The feature vectors M, each of which comprises for example 10-500 features m of a recording, are used at S2 to generate a basic classification model by an algorithm. Model generation can take place for example by expectation maximization (EM), or GMM, by a support vector machine (SVM), by self-organizing maps (SOM) or by neural networks.

At S3, acoustic air-borne or structure-borne sound signals are recorded or picked up by sound pickups at the object to be investigated. The statistical basic classification model of acoustic features m generated at S2 is automatically adapted at S3 based on acoustic features m of the noise signal picked up at S3. In one possible embodiment the basic classification model features at least one statistical parameter P for each feature m. These statistical parameters P include for example a mean value $\mu$ or a variance $\sigma^2$. The features m can be based on a Gaussian distribution, with a mean value $\mu$ and a variance $\sigma^2$ of the distribution being specified for each feature m based on the sound recordings of the reference object. For example at S1 sound recordings are made at different reference objects or prototypes and a mean value $\mu$ is calculated in relation to each feature m. If the feature m is the volume of the captured sound signal for example, the mean value $\mu$ of the volume and a variance $\sigma^2$ of the volume are specified as statistical parameters P for the feature of volume in the basic classification model.

Then at S4 the basic classification model is adapted based on the sound recording made at the object to be investigated at S3, by adapting the statistical parameters P for each feature m of the basic classification model correspondingly. In one possible embodiment of the method the sound recording at the object to be investigated at S3 and the adaptation of the basic classification model at S4 can take place during commissioning of the object to be investigated. In one alternative embodiment the sound recording at S3 and the adaptation at S4 take place at regular maintenance intervals, for example once a day. In a further possible embodiment the sound recording at S3 and the adaptation of the basic classification model at S4 take place when there is a change in the acoustic environment of the object to be investigated, for example when the object is moved into a different space. The sound recording and adaptation can also take place as required, for example after carrying out maintenance work on the object to be investigated or when a user deems an investigation to be necessary.

At S5, the state of the noise-generating object to be investigated is classified based on the adapted statistical classification model. This state classification can take place based on all or some of the features m of the adapted basic classification model. For example a noise-generating object to be investigated can be classified as defective, if the feature volume exceeds a set threshold value.

At S6, the classified state of the object to be investigated is output and necessary measures are then instituted as required.

Figure 2:
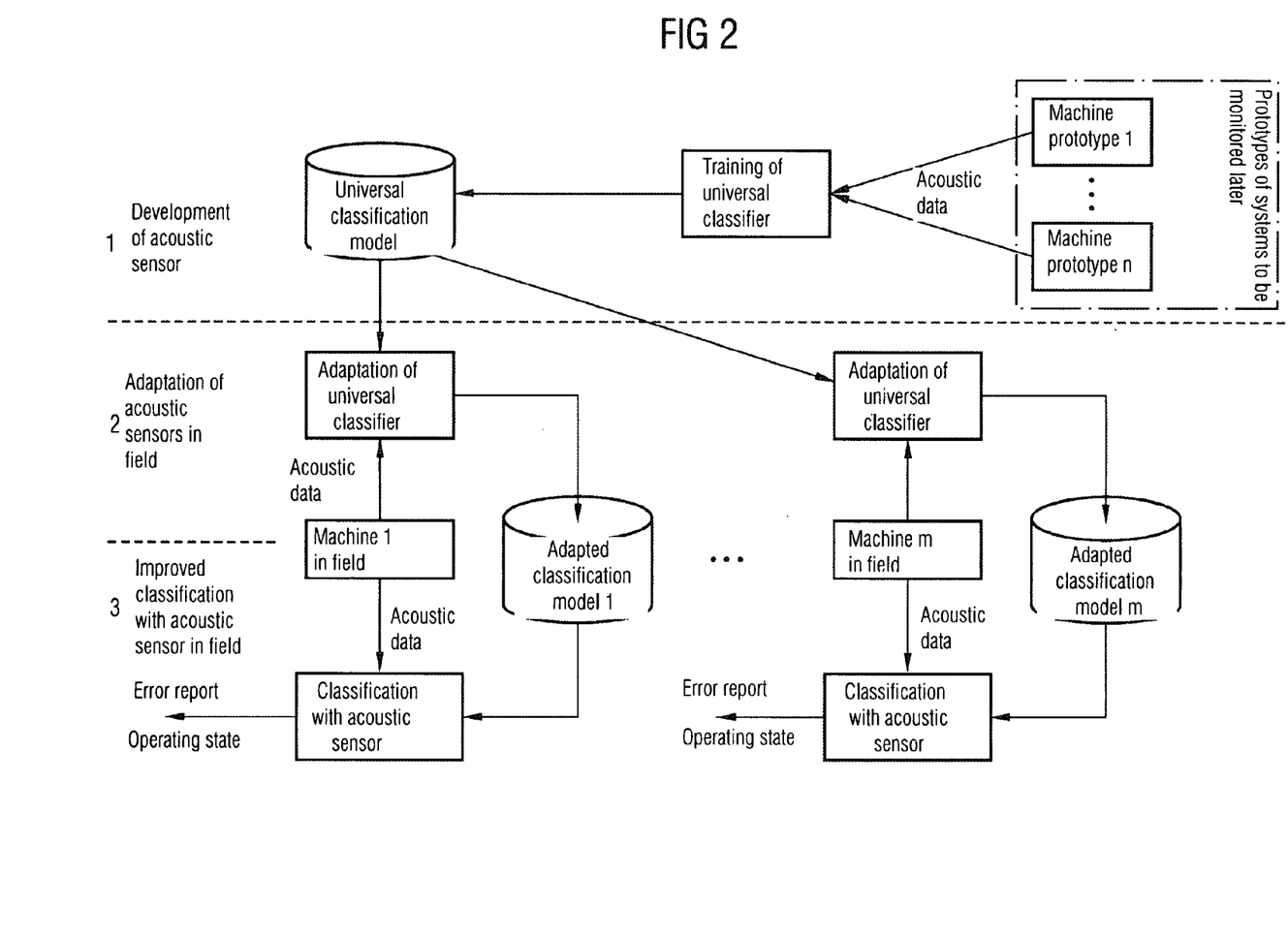
FIG. 2 is a further flow diagram illustrating the method.

FIG. 2 shows a diagram to clarify one possible embodiment of the method for recognizing a state of a noise-generating object to be investigated. The object illustrated in FIG. 2 is a machine, which supplies acoustic data. Sound recordings are first made at n prototypes of the machine and a universal statistical basic classification model is generated based on the training data. This universal basic classification model is stored in a memory or database. This general classification model may feature the essential properties of a normal state and/or possible errors or maintenance states of the object or machine. The universal basic classification model is then adapted for the different manufactured machines. In the example illustrated in FIG. 2 different machines are investigated in the field. Each machine supplies an acoustic noise signal or acoustic data, which is used for the individual adaptation of the stored universal classification model.

This results in an associated adaptive classification model for each machine, which can be buffered in a memory. The state of the respective noise-generating machine to be investigated is then classified by a classification algorithm based on the adapted statistical classification model, in order to capture an operating state or to generate an error report. As shown in FIG. 2, the considerable outlay required to generate a classification model based on at least one prototype is only required once. The subsequent adaptation of the formed statistical basic classification model can take place with relatively little computation outlay in a short time or in real time. While the generation of the statistical basic classification model requires a plurality of captured sound recordings and significant processor power, the adaptation of the stored basic classification model for the respective object to be investigated can take place automatically in the field with little computation outlay when ambient conditions change, without a corresponding expert or specialist having to be present on site. Comparatively little additional acoustic data and comparatively few additional sound recordings at the respective machine or object are also required to adapt the statistical basic classification model. The method provides for a two-stage approach, namely first the formation of a universal statistical basic classification model followed by an adaptation of this classification model for the respective object to be investigated in the field.

Figure 3:
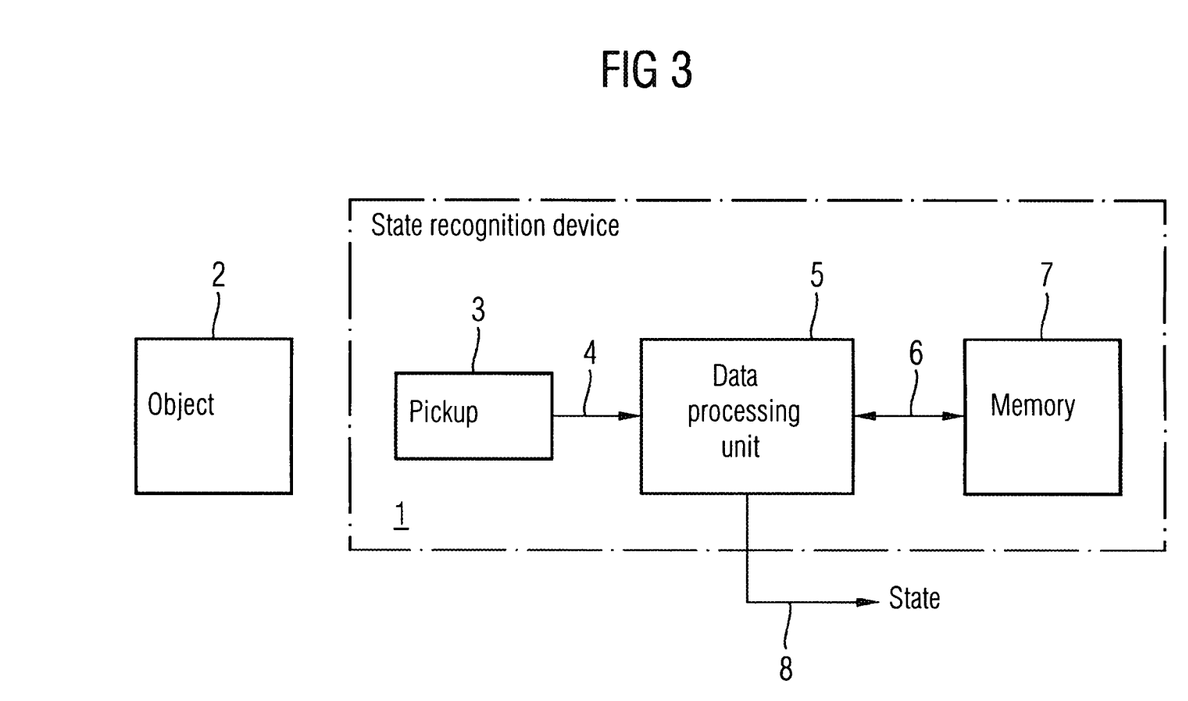
FIG. 3 is a block diagram of a possible embodiment of the device for recognizing a state of a noise-generating object to be investigated.

FIG. 3 shows an exemplary embodiment of a device 1 for recognizing a state of a noise-generating object to be investigated. The object 2 to be investigated is for example a device or machine. The device 1 has at least one pickup 3 to capture a structure-borne or air-borne sound signal generated by the noise-generating object to be investigated 2. The pickup 3 captures the oscillation signal emitted by the object 2. The pickup 3 is for example an acoustic sound pickup for capturing an air-borne sound signal, in other words a microphone. In an alternative embodiment the pickup 3 is attached directly to the object 2 and captures structure-borne sound or vibrations of the object 2. A pickup 3 can be an acceleration sensor for example. The pickup 3 converts the sound or vibration signal to an electrical signal and outputs this by way of a line 4 to a data processing unit 5. The data processing unit 5 is for example a microprocessor, in which a program is executed. The data processing unit 5 is connected by way of lines 6 to a memory 7, in which the generated basic classification model is stored. In an alternative embodiment the data processing unit 5 receives the basic classification model by way of an interface. The data processing unit 5 adapts the basic classification model of acoustic features based on acoustic features m of a noise generated by the object 2 to be investigated. The state of the noise-generating object to be investigated 2 is classified by the data processing unit 5 by a classification algorithm based on the adapted statistical classification model. This state is reported by way of output lines 8. In one possible embodiment the pickup 3 and the data processing unit 5 are integrated in one structural element. This structural element can be attached to any object 2.

Figure 4A:
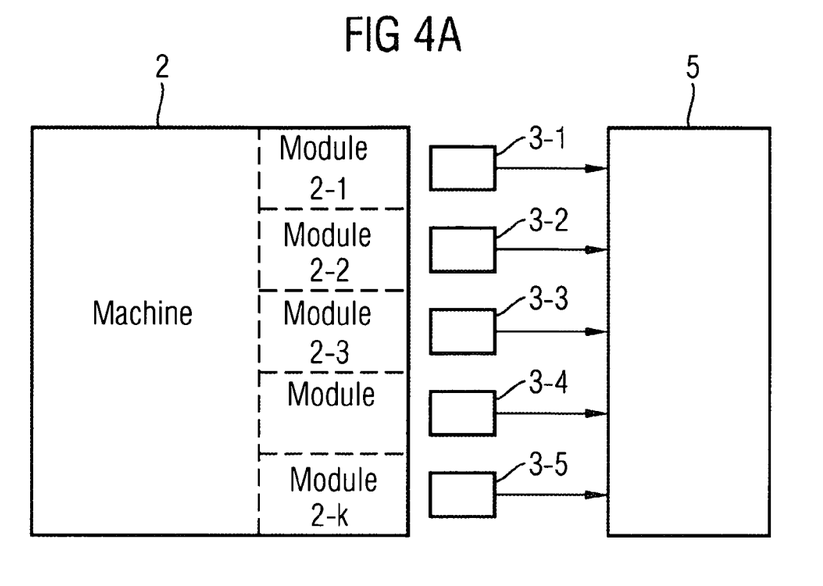
FIGS. 4A and 4B are block diagrams of further embodiments of the device for recognizing a state of a noise-generating object to be investigated.
Figure 4B:
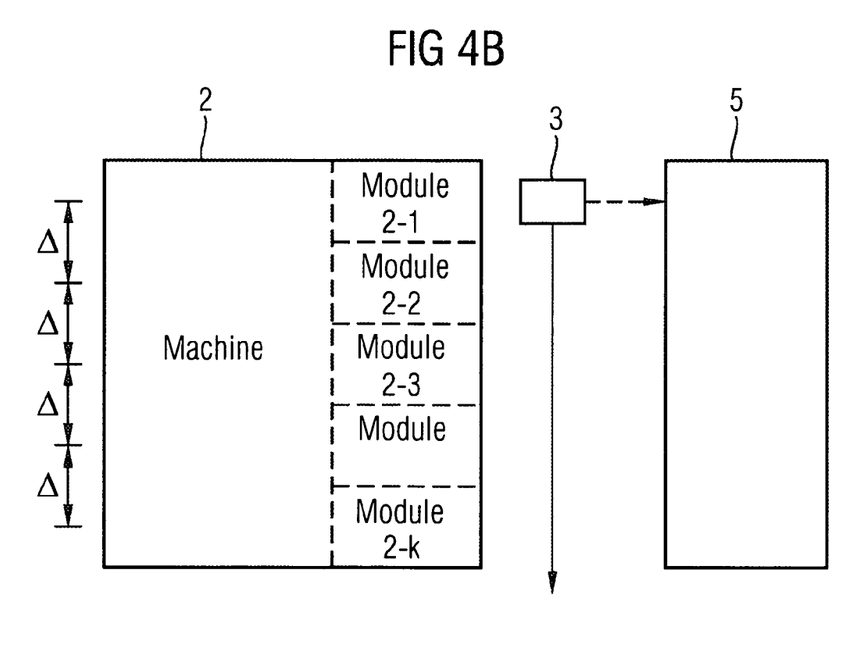

FIGS. 4A, 4B show further variants of the device 1 for recognizing a state of a noise-generating object to be investigated 2. In the exemplary embodiment the noise-generating object 2 is a machine or device, which features a plurality of machine modules 2-1, 2-2 to 2-k of identical type. One example of such a machine 2 is a letter-sorting system, which features a plurality of segments or sorting compartments of identical structure. The different segments or modules of the letter-sorting system 2 are subjected to different loading in certain circumstances and therefore experience different levels of wear. Such letter-sorting systems can also be located in different acoustic environments. In the exemplary embodiment illustrated in FIG. 4A an associated pickup 3 is attached to each module of the machine 2, being provided to monitor the operating state of the respective module based on the noise signal emitted by the module. The data processing unit 5 then performs operations S3-S6 of the sequence illustrated in FIG. 1 for each module 2-$i$ of the machine 2.

In the alternative embodiment illustrated in FIG. 4B a pickup 3 is not provided for each module 2-$i$ of the machine 2 but a pickup, for example a sound pickup, is made to pass the machine 2 in a linear manner and outputs the captured noise signal to the data processing unit 5 for example by way of an air interface. Since the spatial arrangement of the different modules 2-$i$ within the object to be investigated 2 is known, the data processing unit 5 can calculate an adapted statistical classification model for each of the different positions of the acoustic sound pickup 3 as it passes the object to be investigated 2. For example in a letter-sorting system the distance $\Delta$ between the different segments or sorting compartments is known. The different possible positions of the passing acoustic sound pickup 3 correspond to the spatial arrangement of the different modules 2-$i$ of the noise-generating letter-sorting system to be investigated 2.

In one possible embodiment an adapted classification model for the entire letter-sorting system 2 is created in the field from a universal classification model of a prototype. In an alternative embodiment an adapted classification model is generated for each compartment or segment 2-$i$ of the letter-sorting system 2.

The acoustic monitoring of the different modules 2-$i$ can take place by vibration sensors or microphones. The vibrations sensors are attached directly to the housing and capture a structure-borne sound. In one possible embodiment the microphones can have a specific directional characteristic. The distance from the microphones or pickups 3 to the object to be investigated 2 can vary between a few millimeters and several meters. In one possible embodiment acoustic monitoring takes place by only one sound pickup 3, which is passed automatically or manually by the letter-sorting system 2 to locate an error. In one alternative embodiment a plurality of sound pickups 3 are provided, each observing a part of the system or the object to be investigated 2.

If an adapted classification model is created for the entire system or the entire letter-sorting system 2, the adaptation can be carried out by moving the sound pickup 3 to different characteristic positions of the system and recording acoustic data there. The recorded acoustic data is used to generate the adapted statistical classification model.

If an adaptation is carried out for each compartment or segment of the letter-sorting system 2, a sound pickup 3 can record data and calculate a separate adapted model for this. This adapted model can be stored locally in the sensor or sound pickup or alternatively centrally. Alternatively the sound pickup 3 can be moved to different positions of the letter-sorting system 2 and record the acoustic data locally there. The sound pickup 3 can also calculate an adapted classification model for the respective position of the sound pickup or calculate adaptive classification models from a plurality of comparable positions for example for machine segments or modules of identical structure.

If in one possible embodiment the classification model is adapted once during commissioning of the letter-sorting system 2, the pickup(s) 3 is/are switched to a "classification" operating state and error recognition is activated. The adaptation can be repeated at any time if required, for example when components or entire modules are replaced or when the acoustics of the space change. It is then possible, instead of the basic classification model or universal model, to use a model that has already been adapted during the commissioning of the letter-sorting system 2, depending on whether or not the acoustic situation in the space has changed. The method for recognizing a state of a noise-generating object to be investigated 2 is suitable for any objects, for example for monitoring motors, pumps, automation systems or chemical systems.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for recognizing an operational state of a noise-generating object to be investigated that generates noise during operation, where the noise is not purposely generated by the noise-generating object, but results from the operation thereof, comprising:

performing a two-stage process for generating an individually adapted statistical classification model of acoustic features, comprising:

(a) in a first stage, generating a statistical basic classification model of acoustic features based on a plurality of acoustic sound recordings made during operation of at least one reference object in different conditions or at different times, the statistical basic classification model defining one or more acoustic features corresponding to different operational states of the at least one reference object and a statistical parameter for at least one acoustic feature; and (a) in a second stage, subsequent to the generation of the statistical basic classification model, generating an individually adapted statistical classification model specific to the noise-generating object by:

making sound recordings of an operation of the noise-generating object, the noise-generating object being separate from the at least one reference object;

determining acoustic feature measurements from the sound recordings of the noise-generating object;

automatically adapting the statistical basic classification model of acoustic features generated for the at least one reference object, based on the acoustic feature measurements determined from the sound recording signals of the operation of the noise-generating object to obtain the individually adapted statistical classification model specific to the noise-generating object, wherein adapting the statistical basic classification model includes adjusting the statistical parameter for the at least one acoustic feature;

applying the individually adapted statistical classification model, including the adjusted statistical parameter for the at least one acoustic feature, to further acoustic feature measurements determined from further sound recordings of the operation of the noise-generating object; and classifying, by the processor, the operational state of the noise-generating object based on the application of the individually adapted statistical classification model to the further acoustic feature measurements.

2. The method as claimed in claim 1, wherein the at least one reference object is formed by a prototype of the noise-generating object to be investigated.

3. The method as claimed in claim 1, wherein the noise-generating object has at least one noise-generating module.

4. The method as claimed in claim 1, wherein said adapting of the statistical basic classification model occurs during commissioning of the noise-generating object.

5. The method as claimed in claim 1, further comprising storing the statistical basic classification model in a memory.

6. The method as claimed in claim 5, further comprising buffering the individually adapted statistical classification model.

7. The method as claimed in claim 6, further comprising making the acoustic sound recordings using acoustic sound pickups which capture at least one of air-borne sound and structure-borne sound.

8. The method as claimed in claim 7, further comprising at least one of attaching the acoustic sound pickups to the noise-generating object and relative movement of the acoustic sound pickups and the noise-generating object.

9. The method as claimed in claim 8, further comprising calculating an adapted statistical classification model for different possible positions of the acoustic sound pickup passing the noise-generating object.

10. The method as claimed in claim 9, wherein the different possible positions of the acoustic sound pickup correspond to a spatial arrangement of different modules of the noise-generating object.

11. The method as claimed in claim 1, further comprising making the acoustic sound recordings using acoustic sound pickups which capture at least one of air-borne sound and structure-borne sound.

12. The method as claimed in claim 11, further comprising at least one of attaching the acoustic sound pickups to the noise-generating object and relative movement of the acoustic sound pickups and the noise-generating object.

13. The method as claimed in claim 12, further comprising calculating an adapted statistical classification model for different possible positions of the acoustic sound pickup passing the noise-generating object.

14. The method as claimed in claim 13, wherein the different possible positions of the acoustic sound pickup correspond to a spatial arrangement of different modules of the noise-generating object.

15. The method as claimed in claim 1, wherein said adapting adapts the statistical classification model for the noise-generating object as a whole or for modules of the noise-generating object.

16. The method as claimed in claim 1, comprising automatically adapting the statistical basic classification model at regular maintenance intervals.

17. The method as claimed in claim 1, comprising automatically adapting the statistical basic classification model when the noise-generating object is moved.

18. The method as claimed in claim 1, wherein the noise-generating object and the at least one reference object comprise distinct instances of the same type object.

19. The method as claimed in claim 1, wherein classifying, by the processor, the operational state of the noise-generating object based on the individually adapted statistical classification model comprises classifying the noise-generating object as defective.

20. A device for recognizing an operational state of a noise-generating object to be investigated that generates noise during operation, where the noise is not purposely generated by the noise-generating object, but results from the operation thereof, the device comprising:
a non-transitory memory unit storing a statistical basic classification model of acoustic features based on a plurality of acoustic sound recordings made during operation of at least one reference object in different conditions or at different times, the statistical basic classification model defining one or more acoustic features corresponding to different operational states of the at least one reference object and a statistical parameter for at least one acoustic feature;
a data processing unit communicatively coupled to the memory and configured to:
receive sound recording signals from sound recordings of an operation of the noise-generating object, the noise-generating object being separate from the at least one reference object;
determine acoustic feature measurements from the sound recording signals of the operation of the noise-generating object;
adapt the statistical basic classification model of acoustic features generated for the at least one reference object, based on the acoustic feature measurements determined from the sound recording signals of the operation of the noise-generating object to obtain an individually adapted statistical classification model specific to the noise-generating object, wherein adapting the statistical basic classification model includes adjusting the statistical parameter for the at least one acoustic feature;
receive further sound recordings of the operation of the noise-generating object, and determine further acoustic feature measurements from the further sound recordings of the noise-generating object;
apply the individually adapted statistical classification model, including the adjusted statistical parameter for the at least one acoustic feature, to the further acoustic feature measurements determined from the further sound recordings; and
classify the operational state of the noise-generating object based on the application of the individually adapted statistical classification model to the further acoustic feature measurements.

21. The device as claimed in claim 20, further comprising at least one acoustic sound pickup capturing at least one of a structure-borne sound and an air-borne sound generated by the noise-generating object.

22. A non-transitory computer-readable medium encoded with a computer program that when executed causes a processor to perform a method for recognizing an operational state of a noise-generating object to be investigated that generates noise during operation, where the noise is not purposely generated by the noise-generating object, but results from the operation thereof, the computer program being executable by the processor to:
access from memory a statistical basic classification model of acoustic features based on a plurality of acoustic sound recordings made during operation of at least one reference object in different conditions or at different times, the statistical basic classification model defining one or more acoustic features corresponding to different operational states of the at least one reference object and a statistical parameter for at least one acoustic feature;
receive sound recording signals from sound recordings of an operation of the noise-generating object, the noise-generating object being separate from the at least one reference object;
determine acoustic feature measurements from the sound recording signals of the operation of the noise-generating object;
adapt the statistical basic classification model of acoustic features generated for the at least one reference object, based on the acoustic feature measurements determined from the sound recording signals of the operation of the noise-generating object to obtain an individually adapted statistical classification model specific to the noise-generating object, wherein adapting the statistical basic classification model includes adjusting the statistical parameter for the at least one acoustic feature;
receive further sound recordings of the operation of the noise-generating object, and determine further acoustic feature measurements from the further sound recordings of the noise-generating object;
apply the individually adapted statistical classification model, including the adjusted statistical parameter for the at least one acoustic feature, to the further acoustic feature measurements determined from the further sound recordings; and
classify the operational state of the noise-generating object based on the application of the individually adapted statistical classification model to the further acoustic feature measurements.

* * * * *